United States Patent
King

(10) Patent No.: US 8,328,005 B2
(45) Date of Patent: Dec. 11, 2012

(54) BELT TENSION INDICATOR

(75) Inventor: Michael L. King, Weatherford, TX (US)

(73) Assignee: Siemens Industry, Inc., Alpharetta, GA (US)

( * ) Notice: Subject to any disclaimer, the term of this patent is extended or adjusted under 35 U.S.C. 154(b) by 289 days.

(21) Appl. No.: 12/799,636

(22) Filed: Apr. 28, 2010

(65) Prior Publication Data
US 2010/0276252 A1    Nov. 4, 2010

Related U.S. Application Data

(60) Provisional application No. 61/173,330, filed on Apr. 28, 2009.

(51) Int. Cl.
*B65G 43/00*    (2006.01)
(52) U.S. Cl. .................... 198/810.04; 198/813
(58) Field of Classification Search ............. 198/810.04, 198/811, 813, 814, 815
See application file for complete search history.

(56) References Cited

U.S. PATENT DOCUMENTS

| | | | |
|---|---|---|---|
| 3,360,063 A * | 12/1967 | Hausenblas et al. | 180/9.1 |
| 4,444,065 A | 4/1984 | Okamuro | |
| 4,726,223 A * | 2/1988 | Huang | 73/146.8 |
| 5,483,826 A * | 1/1996 | Schultz et al. | 73/146.5 |
| 5,698,796 A * | 12/1997 | Hirano | 73/862.41 |
| 5,899,321 A * | 5/1999 | El-Ibiary | 198/807 |
| 5,959,220 A | 9/1999 | Jun | |
| 6,011,462 A | 1/2000 | Cooper | |
| 6,088,559 A * | 7/2000 | Costanza et al. | 399/165 |
| 6,427,827 B1 * | 8/2002 | Berndtsson | 198/626.6 |
| 7,117,989 B2 * | 10/2006 | Weigel et al. | 198/810.04 |
| 2005/0285323 A1 | 12/2005 | Gulbrandsen et al. | |

* cited by examiner

*Primary Examiner* — Gene Crawford
*Assistant Examiner* — Keith R Campbell

(57) ABSTRACT

A method for verifying belt tension on a conveyor mechanism that includes a belt mounted under tension on rollers, includes steps of measuring selected physical status parameters associated with the conveyor mechanism and determining if the belt has reached a predetermined level of tension indirectly from such status parameters without direct measurement of belt tension.

7 Claims, 3 Drawing Sheets

BELT TENSION INDICATOR

This application claims priority of U.S. Provisional Application No. 61/173,330 filed Apr. 28, 2009.

FIELD OF THE INVENTION

This invention relates to a system and method for indicating the tension of a belt of the kind used in pinch belt conveyor systems used in postal sorting machines

BACKGROUND OF THE INVENTION

A number of prior inventions provide a method and system for sorting flat mail wherein maintaining proper belt tension is important to maintaining sorting efficiency and avoiding misfeeds and other sorting errors. It is known for example to provide for an alarm when a misfeed is detected. See for example United States Patent Application 20050285323, Dec. 29, 2005. Detection devices used in sorting equipment are generally designed to detect abnormal conditions and failures of different kinds.

SUMMARY OF THE INVENTION

An apparatus for verifying belt tension according to the invention comprises a conveyor mechanism that includes a belt mounted under tension on rollers; a bladder pressurized by internal gas pressure in a position proximate the belt; a monitoring roller assembly in engagement with a surface of the belt whereby tension of the belt causes the belt to exert force against the bladder through the monitoring roller assembly and an indicator which shows when the tension of the belt is at a target level.

The invention further provides a method for verifying belt tension on a conveyor mechanism that includes a belt mounted under tension on rollers, comprising measuring selected physical status parameters associated with the conveyor mechanism, and determining if the belt has reached a predetermined level of tension indirectly from such status parameters without direct measurement of belt tension.

DETAILED DESCRIPTION

Figure 1:
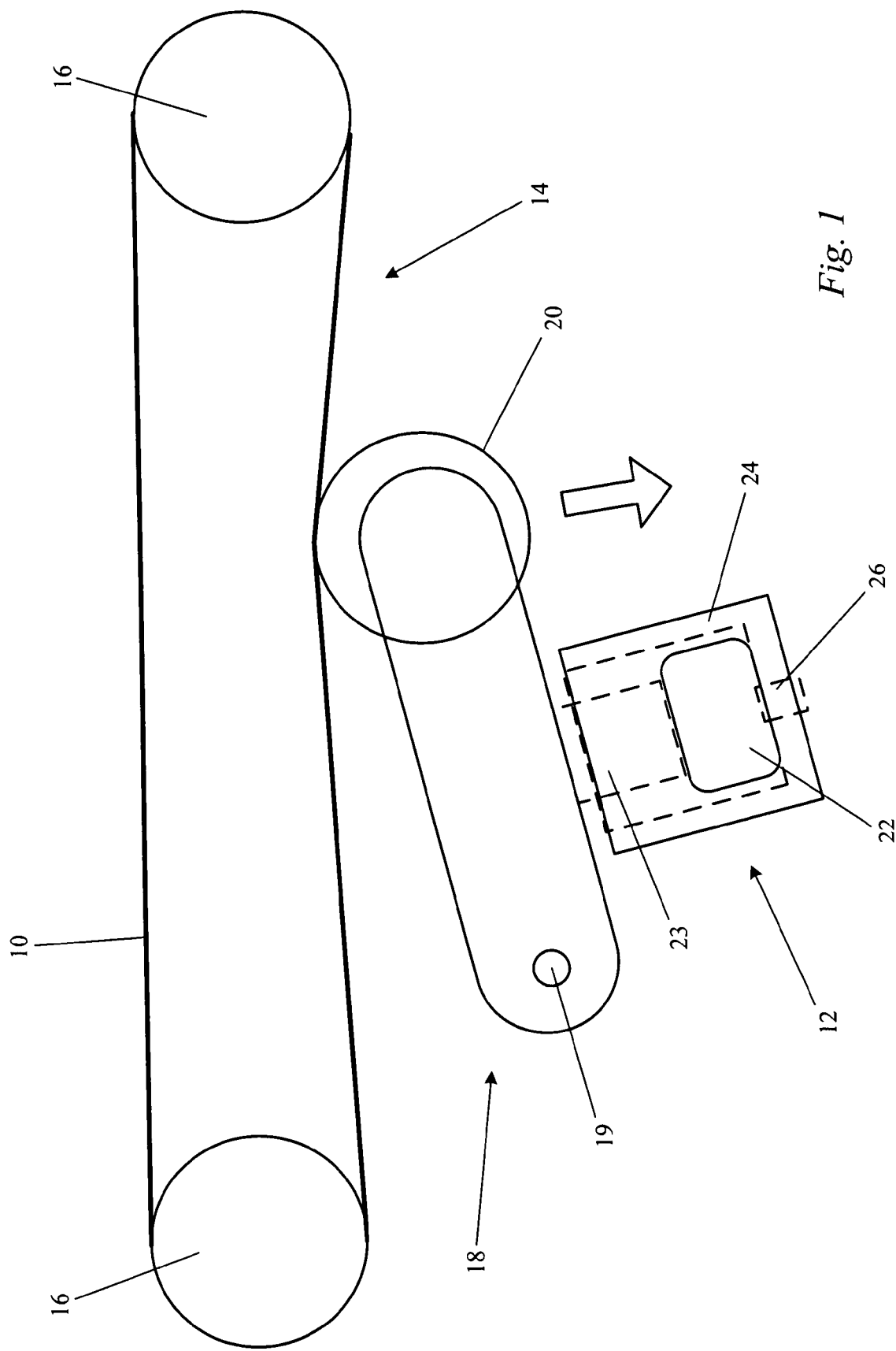
FIG. 1 is a schematic diagram of an apparatus according to the invention in an operative position indicating that the belt tension is below the target level.
Figure 2:
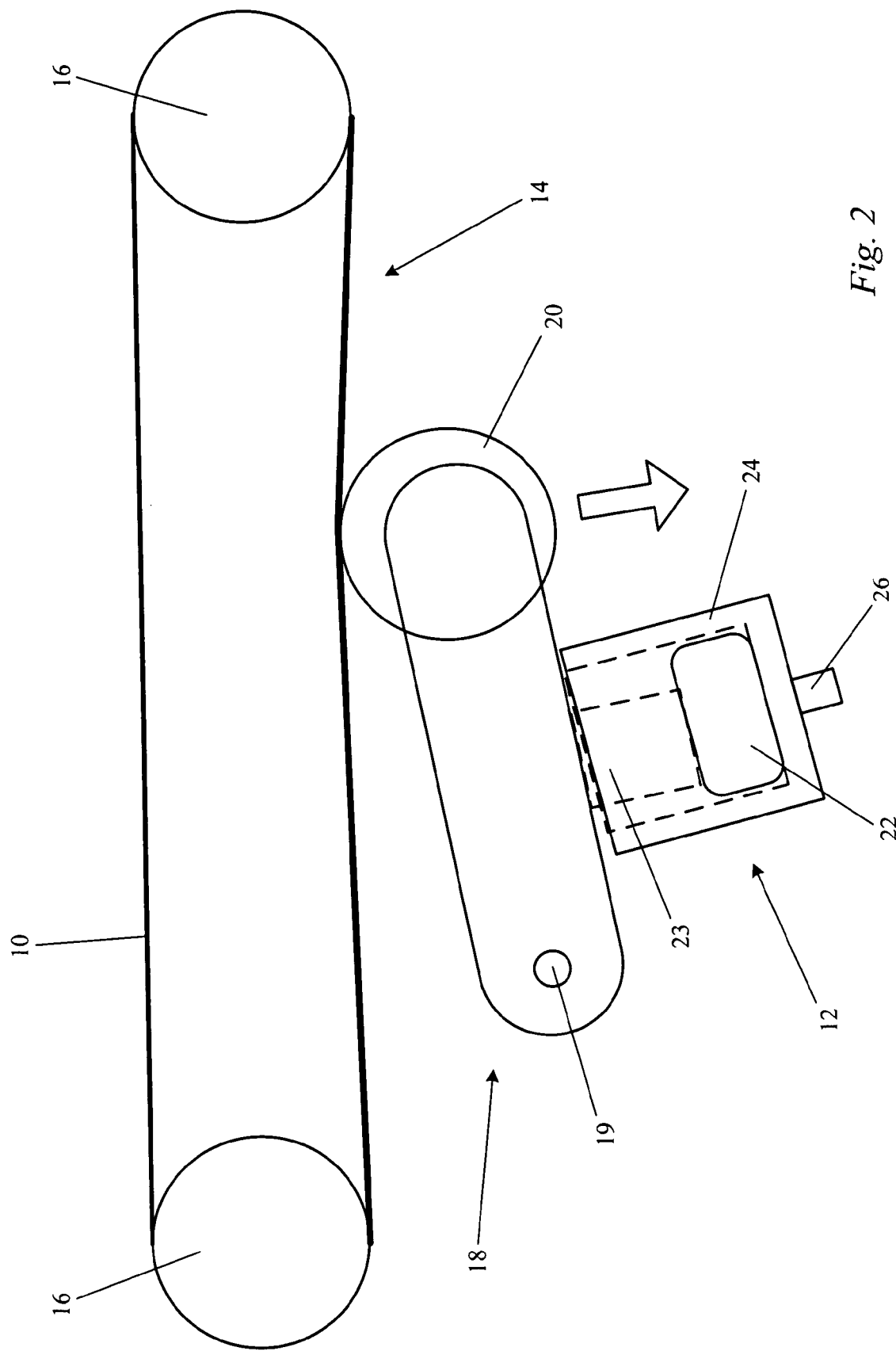
FIG. 2 is a schematic diagram of an apparatus according to the invention as shown in FIG. 1 in an operative position indicating that the belt tension at or above the target level.
Figure 3:
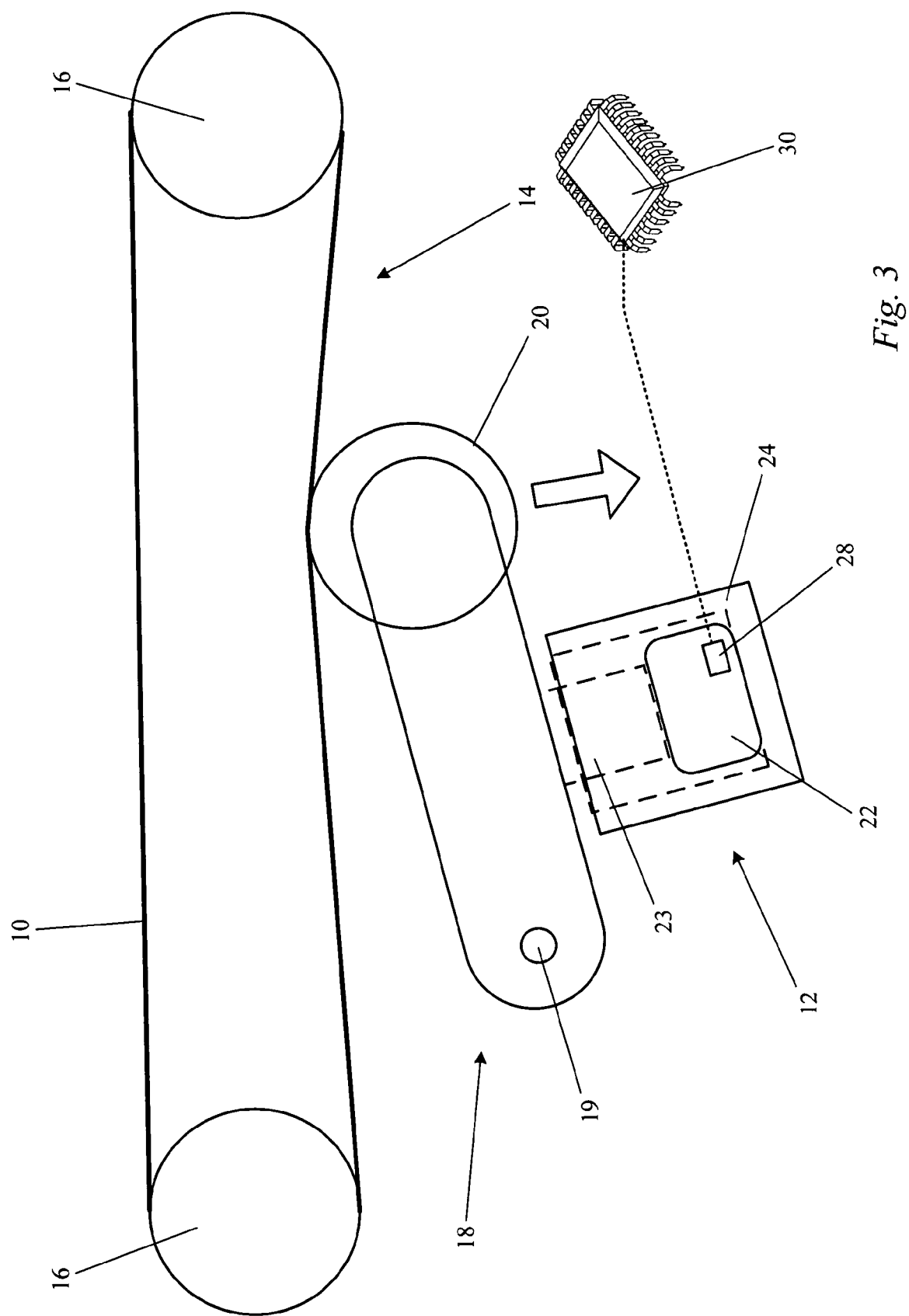
FIG. 3 is a schematic diagram of an alternate apparatus according to the invention in an operative position indicating that the belt tension is at or above a target level.

A belt conveyor 10 is of the type suitable for transporting a series of flat mail pieces in a postal sorting machine such as DBCS and MLOCR machines includes a belt tension indicator 12 according to the invention. Tensioning of the pinch belt 14 will cause the belt 14 to try and assume a straight line between the two fixed rollers 16, thus exerting force on a monitoring roller assembly 18 which includes a roller 20 which engages the underside of belt 14. As belt 14 is tensioned, it will cause a monitoring roller assembly 18 swings about a pivot 19 to exert force in the direction of the arrow against an air bladder 22. Assembly 18 is configured so that a pusher 23 slidably mounted in a frame 24 exerts such force on bladder 22. In the embodiment of FIG. 1, then the tension of belt 14 is at the desired level pusher 23 exerts force against bladder 22 which causes an indicator 36 to show that the required belt tension has been achieved. Bladder 22 causes an indicator 26 in the form of a tube to pop out in the same manner as is known for use in conventional tires. The present invention uses this form of air pressure gauge in a manner that correlates with belt tension in a manner not practiced in the prior art and which determines belt tension indirectly, i.e. by derivation from other known quantities of the system rather than by a sensor which directly measures belt tension. Indeed the relationship between bladder pressure and belt tension provides a simple mechanism according to the invention. FIG. 3 provides an alternate embodiment of the invention wherein an electronic pressure sensor 28 is connected to a processor 30 so that the processor can light an LED typically at a remote location (a control room or panel) when the belt tension is at the desired level and the processor can monitor the tension of the belt.

Although several embodiments of the present invention have been described in the foregoing detailed description and illustrated in the accompanying drawings, it will be understood by those skilled in the art that the invention is not limited to the embodiments disclosed but is capable of numerous rearrangements, substitutions and modifications without departing from the spirit of the invention. Such modifications are within the scope of the invention as expressed in the appended claims. Connections between parts that fit together as shown in the drawings are loose enough to permit the limited movements shown without mechanical interference.

The invention claimed is:

1. An apparatus for verifying belt tension on a conveyor mechanism that includes a belt mounted under tension on rollers, comprising
    a bladder pressurized by internal gas pressure mounted in a position proximate the belt;
    a monitoring roller assembly in engagement with a surface of the belt whereby tension of the belt causes the belt to exert force against the bladder through the monitoring roller assembly; and
    an indicator which shows when the tension of the belt is at a target level.

2. The apparatus of claim 1, wherein the indicator comprises a monitoring stem which assumes an extended position when the belt tension is at the target level.

3. The apparatus of claim 1, wherein the monitoring roller assembly includes a pivot at one end portion thereof whereby pivoting of the monitoring roller assembly in a predetermined direction by tension of the belt causes force to be exerted by the monitoring roller assembly against the bladder.

4. The apparatus of claim 1, wherein the indicator comprises a pressure transducer in communication with a pressurized interior of the bladder, and a transmitter that that sends a signal from the pressure transducer indicating that the tension of the belt is at the target level.

5. A method for verifying belt tension on a conveyor mechanism that includes a belt mounted under tension on rollers, comprising
    measuring selected physical status parameters associated with the conveyor mechanism, the physical status parameters including air pressure in a bladder caused by the belt tension; and
    determining if the belt has reached a predetermined level of tension indirectly from such status parameters without direct measurement of belt tension.

6. The apparatus of claim 1, wherein the monitoring stem extends through a surface of the bladder.

7. An apparatus for verifying belt tension on a conveyor mechanism that includes a belt mounted under tension on rollers, comprising
- a bladder pressurized by internal gas pressure mounted in a position proximate the belt;
- a monitoring roller assembly, including a pivot at one end, in engagement with a surface of the belt, whereby tension of the belt causes the monitoring roller assembly to pivot in a predetermined direction to exert force against the bladder; and
- an indicator which shows when the tension of the belt is at a target level based on the internal gas pressure of the bladder.

* * * * *